United States Patent
Pollet et al.

[11] 3,793,032
[45] Feb. 19, 1974

[54] COATING AIDS FOR FILM-FORMING COATING COMPOSITIONS

[75] Inventors: Robert Joseph Pollet, Vremde; Marcel Cyriel DeFre, Edegem; Arthur Henri DeCat, Mortsel, all of Belgium

[73] Assignee: Agfa-Gevaert N.V., Mortsel, Belgium

[22] Filed: June 4, 1971

[21] Appl. No.: 150,197

[30] Foreign Application Priority Data
June 4, 1970 Great Britain .................... 27080/70

[52] U.S. Cl. .............................. 96/114.5, 96/94 R
[51] Int. Cl. ........................... G03c 1/36, G03c 1/02
[58] Field of Search .......... 96/94, 114.5, 109 R, 94; 106/125

[56] References Cited
UNITED STATES PATENTS

| | | | |
|---|---|---|---|
| 2,719,087 | 9/1955 | Knox | 96/114.5 |
| 3,026,202 | 3/1962 | Knox | 96/114.5 |
| 3,068,101 | 12/1962 | Knox | 96/114.5 |
| 3,415,649 | 12/1968 | Nishio | 106/125 |
| 3,525,620 | 8/1970 | Nishio | 96/114.5 |
| 2,368,287 | 1/1945 | Chilton | 96/109 |
| 2,527,260 | 10/1950 | Hart et al. | 96/109 |
| 3,516,835 | 6/1970 | Mackay et al. | 96/114.5 |

OTHER PUBLICATIONS
Making and Coating Photographic Emulsions, Zelikman, V.L., 1964, pp. 262–263.
Richter: Textbook of Org. Chem., Third Edition, 1952, pp. 412, John Wiley.
Rufus A. Lyman, M. D., American Pharmacy, 1945, J. B. Lippincott, pages 151–153.

*Primary Examiner*—J. Travis Brown
*Assistant Examiner*—Alfonso T. Suro Pico
*Attorney, Agent, or Firm*—A. W. Breiner

[57] ABSTRACT

Coating compositions comprising a hydrophilic colloid and at least one surface active compound corresponding to the formula:

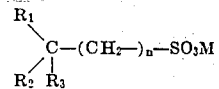

wherein:
M stands for hydrogen, an alkali metal atom, ammonium or organic ammonium,
$n$ stands for 0 or 1,
$R_3$ stands for hydrogen or when $n = 1$ may be alkyl, and
each of $R_1$ and $R_2$ stands for a straight-chain or branched-chain alkyl group or together represent the atoms necessary to close an alicyclic ring structure, and the use of the aforesaid hydrophilic colloids in photographic elements are described. The coating compositions are excellent inexpensive synthetic coating aids in photographic elements.

12 Claims, No Drawings

COATING AIDS FOR FILM-FORMING COATING COMPOSITIONS

This invention relates to surface-active compounds suitable for use as coating aids for film-forming coating compositions comprising a hydrophilic colloid, and to hydrophilic colloid compositions comprising said coating aids.

In the application of film-forming coating compositions comprising a hydrophilic colloid to surfaces, particularly in the photographic industry, it is desirable to apply such coating compositions uniformly and at good production speeds. In many cases it is even desirable to apply such coatings over other previous layers, which are either wet or dry.

It is necessary, in the photographic industry, that colloid compositions ready for coating are entirely hydrophilic to obtain a uniform layer therewith comprising no hydrophobic inclusions that may lead to repellency spots or comets in the said layer. Moreover, the entire surface of a layer formed from such colloid compositions should be hydrophilic so that it can be rewet readily either by the processing solutions if said layer is the top layer of a photographic material to be processed, or by the coating compositions that will be applied to said layer for forming a next layer. Indeed, during processing, air-bubbles are more easily carried along by a hydrophobic surface than by a hydrophilic surface, which air-bubbles will manifest themselves as small undeveloped areas in the processed material; moreover, when the material comprises hydrophobic inclusions so that its surface is not entirely hydrophilic but shows hydrophobic areas, water will not uniformly wet the said surface in that it is repelled at the hydrophobic areas and form drops thereon. After processing such materials cannot be dried uniformly. They show a poor retouchability when it is desired to retouch such-like materials.

In the case wherein the layer formed from the said colloid composition is overcoated with a following layer, the maximum speed of the moving layer to be overcoated, at which no repellency occurs can be increased, when and to the extent that the surface to be overcoated is more hydrophilic; local hydrophobic areas at the surface of the layer to be overcoated can give rise to the formation of so-called repellency spots or comets in the said next layer.

Thus, in order to eliminate all these possible coating defects such as air bubbles, repellency spots, or "comets" the use of coating aids has been widely adopted.

Saponin is conventionally used as coating aid for coating compositions comprising hydrophilic colloids. Though this product excells by its favourable "anti-comet" action, it may vary markedly from batch to batch and is much more expensive than synthetic coating aids. Moreover, it may adversely affect the photographic properties of an emulsion containing it.

A number of synthetic surface active agents have been proposed for use as coating aids to facilitate the coating of compositions comprising hydrophilic colloids more particularly gelatin layers. Most of these coating aids do improve some properties of the layer. However, they adversely affect other desired properties. For instance, hydrophilic cooloid layers comprising coating aids, which prevent the formation of "comets" in the said layers, may have an inadequate rewettability, which causes difficulties in the processing of photographic elements or it may be difficult to overcoat such layers when in wet state, which is quite undesirable especially in simultaneous multilayer applications. In order to overcome these disadvantages it has been proposed to use mixtures of coating aids having different properties.

It has now been found that surface-active compounds corresponding to the following general formula:

$$R-SO_3M$$ 

wherein:

M stands for hydrogen, an alkali metal atom such as lithium, sodium and potassium, ammonium or organic ammonium, e.g., diethanol ammonium, triethanol ammonium, triethyl ammonium and morpholinium, and R stands for a branched-chain aliphatic group of 10 to 20 carbon atoms, preferably an aliphatic group of the formula

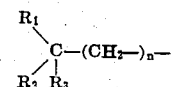

wherein $n$ is 0 or 1, $R_3$ stands for hydrogen or when $n = 1$ may be alkyl such as methyl and each of $R_1$ and $R_2$ stands for a straight-chain or branched-chain alkyl group or together represent the atoms necessary to close an alicyclic ring structure are excellent inexpensive coating aids for use in coating compositions comprising a hydrophilic film-forming colloid such as gelatin.

The coating aids for hydrophilic colloid compositions corresponding to the above general formula can be prepared very easily as illustrated below, by oxidation of the corresponding mercaptans derived from alicyclic alcohols or branched-chain alcohols.

As an example of an alicyclic alcohol, from which the corresponding mercaptan and a coating aid according to the invention can be prepared hydroabietyl alcohol be mentioned.

Examples of branched-chain alcohols that can be used for the preparation of the mercaptans and coating aids therefrom are branched-chain aliphatic secondary alcohols such as the commercially available isotetradecyl alcohol i.e., 2-methyl-7-ethyl-4-undecanol and the widely known branched-chain primary oxo-alcohols having at least 10 C-atoms such as isodecyl alcohol, isotridecyl alcohol, isohexadecyl alcohol and isooctadecyl alcohol. Isodecylalcohol is a commercial material prepared from $C_9$-olefins (tripropylene) by means of the oxo-synthesis (cfr. H. Rompp - Chemie Lexikon - Frank-sche Verlag, Stuttgart, W. Germany) and is a mixture of primary branched-chain $C_{10}$-alcohols. Isotridecyl alcohol is a commercial material prepared from $C_{12}$-olefins (triisobutylene, tetrapropylene or di(2-methyl-1-pentene) by means of the oxo-reaction and is a mixture of primary branched-chain $C_{13}$-alcohols. Isohexadecyl alcohol and isooctadecyl alcohol are commercial materials prepared by aldol-condensation of $C_8$- or $C_9$-aldehydes formed by oxosynthesis isohexadecyl alcohol is a mixture of branched-chain primary $C_{16}$-alcohols mainly consisting of alcohols as represented by the formula

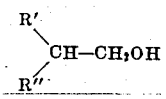

wherein R' = dimethylbutyl and R'' = dimethylhexyl, whereas isooctadecyl alcohol is a branched-chain alcohol for which the following formula is given:

$$H_3C-\underset{\underset{CH_3}{|}}{\overset{\overset{CH_3}{|}}{C}}-CH_2-\underset{\underset{CH_2OH}{|}}{\overset{\overset{CH_3}{|}}{CH}}-CH-CH_2-CH_2-\overset{\overset{CH_3}{|}}{CH}-CH_2-\underset{\underset{CH_3}{|}}{\overset{\overset{CH_3}{|}}{C}}-CH_3$$

Other branched-chain alcohols, from which the coating aids of the invention can be derived, are the branched-chain alcohols prepared by alkaline condensation using catalytic amounts of alkali such as potassium hydroxide at temperatures comprised between 200° and 300° (known as Guerbet-reaction - see e.g., Fette-Seifen-Anstrichmittel, 71, no, 3, p. 215–218 (1969)) of a branched-chain or straight-chain alcohol with the same or other branched-chain or straight-chain alcohol.

More details regarding the preparation, the composition and properties of branched-chain oxo-alcohols, which can be used to form the coating aids according to the present invention can be found in Fortschr, Chem. Forsch. Bd. 11/1, pages 121–134.

Examples of coating aids suitable for use according to the present invention can be represented by the following formulae:

1. $isoH_{33}C_{16}-SO_3Na$

2. $H_3C-\underset{\underset{CH_3}{|}}{\overset{\overset{CH_3}{|}}{C}}-CH_2-\underset{\underset{CH_3}{|}}{\overset{}{C}}H-\underset{\underset{CH_2-SO_3Na}{|}}{\overset{}{C}}H-CH_2-CH_2-\overset{\overset{CH_3}{|}}{C}H-CH_2-\underset{\underset{CH_3}{|}}{\overset{\overset{CH_3}{|}}{C}}-CH_3$ 3. [structure with decalin ring system bearing $H_3C$, $CH_2-SO_3Na$, $CH_3$, and $-CH(CH_3)_2$ substituents]

4. $isoH_{27}C_{13}-SO_3Na$

5. $\begin{array}{c} H_9C_4 \\ \phantom{H_9C_4}\diagdown \\ \phantom{H_9C_4xx}CH-CH_2-SO_3Na \\ \phantom{H_9C_4}\diagup \\ H_3C-(CH_2)_5 \end{array}$ 6. $H_3C-(CH_2)_3-\overset{\overset{C_2H_5}{|}}{C}H-CH_2-CH_2-\overset{\overset{SO_3Na}{|}}{C}H-CH_2-CH\underset{\diagdown CH_3}{\overset{\diagup CH_3}{}}$ The following preparations illustrate how the coating aids of the invention can be prepared.

COMPOUND 1 a. Isohexadecyl bromide

At a temperature of 70° C, hydrogen bromide was introduced into 914 g of isohexadecyl alcohol until the solution was saturated. The water formed was isolated and the oil taken up in ether. The ether layer was washed till neutral, dried over sodium sulphate, and concentrated by evaporation. The residue was distilled.
  Boiling point: 140°C/4 mm.
  Yield: 1092 g.

b. Isohexadecyl isothiouronium bromide 305 g of isohexadecyl bromide and 76 g of thiourea in 600 ml of ethanol were refluxed for 16 hours. The clear solution was concentrated by evaporation and the residue recrystallised from acetonitrile, cooled, filtered, by suction, and dried at 50°C.
  Yield: 316 g.

c. Isohexadecyl mercaptan

To 228 g of isohexadecyl isothiouronium bromide in 420 ml of water and 420 ml of ethanol under a nitrogen atmosphere, 36 g of sodium hydroxide were added with stirring. The mixture was then refluxed for 2 hours and cooled. The solution was acidified with 150 ml of 5N sulphuric acid, poured into 900 ml of water and extracted with 300 ml of methylene chloride. The methylene chloride solution was isolated, dried over magnesium sulphate and concentrated by evaporation. The residue was distilled.
  Boiling point: 125°C/0.3 mm.
  Yield: 150 g.

d. Sodium isohexadecyl sulphonate 51.6 of isohexadecyl mercaptan were added dropwise in 1 hour, at a temperature of 40°C, to 140 ml of nitric acid. The mixture was stirred for 1 hour whereupon it was poured into water. The oil was isolated, washed with water, which had been saturated with sodium chloride, and separated again. The oil was then taken up in 100 ml of methanol and 100 ml of hot water at 40°C and neutralised with sodium hydroxide. The mixture was extracted with methylene chloride and, the axtract dried over magnesium sulphate, concentrated by evaporation and further dried at 110°C.
  Yield: 61 g.

COMPOUND 2 a. Isooctadecyl bromide

At a temperature of 80°C and with stirring hydrogen bromide was introduced into 1,000 ml of isooctadecyl alcohol until saturated. The water formed was separated and the oil taken up in ether. The ether layer was washed acid-free, dried over sodium sulphate and concentrated by evaporation.

The residue was distilled.
  Boiling point: 125°C/0.5 mm.
  Yield: 1010 g.

b. Isooctadecyl isothiouronium bromide 333 g of isooctadecylbromide and 76 g of thiourea in 600 ml of ethanol were refluxed for 16 hours. The clear solution was concentrated by evaporation and the residue recrystallized from acetonitrile, cooled, filtered by suction and dried at 65°C.
  Yield: 293 g.
  Melting point: 150°C.

c. Isooctadecyl mercaptan

To 245 g of isooctadecyl isothiouronium bromide in 420 ml of water and 420 ml of ethanol under nitrogen atmosphere, 36 g of sodium hydroxide were added with stirring. The mixture was refluxed for 2 hours and cooled.

The solution was acidified with 150 ml of 5 N sulphuric acid, poured into 600 ml of water and extracted with 300 ml of methylene chloride. The methylene chloride solution was isolated, dried over magnesium sulphate, and concentrated by evaporation. The residue was distilled.
  Boiling point: 135°C/1.3 mm.
  Yield: 163 g.

d. Sodium isooctadecyl sulphonate 57 g of isooctadecylmercaptan were added dropwise in 1 hour, at a temperature of 45°C, to 140 ml of nitric acid. The mixture was stirred for another hour and then poured into 300 ml of water. The precipitate formed was filtered by suction, taken up in 300 ml of water and 300 ml of methanol and neutralised with sodium hydroxide. The mixture was extracted with methylene chloride and, the extract dried over magnesium sulphate, concentrated by evaporation, and further dried at 110°C.

Yield: 67 g.

Compounds 3 to 6 were prepared in a similar way from the mercaptans derived from hydroabietyl alcohol, isotridecyl alcohol, 2-butyl octanol and isotetradecylalcohol respectively.

The coating aids according to the present invention promote the uniformity of coating and markedly reduce the tendency to form repellency spots. Coating compositions containing the coating aids of use according to the invention can be applied to dry surfaces as well as to wet surfaces and form layers that can be overcoated easily in wet as well as in dry state, the said layers being either light-sensitive layers or not. Light-sensitive hydrophilic colloid materials comprising these coating aids also show improved wettability by photographic processing liquids.

It may sometimes be advisable to use blends of two or more coating aids according to the present invention. Indeed, it is observed frequency that one coating aid according to the invention performs best in one respect e.g., as regards its anticomet properties, whereas another is definitely superior in a different effect, e.g., promoting uniformity of coating. These blends provide the major effects required and can often show characteristics superior to either coating aid alone. These effects may also result with blends of the coating aids of use according to the present invention with known coating aids such as saponin and other synthetic coating aids.

The coating aids of the present invention have also favourable properties for dispersing or emulsifying substances in hydrophilic colloid compositions, which as a result of the presence of said coating aids also show improved coating characteristics. For instance they are suitable as dispersing agent or emulsifying agent for substances that are to be incorporated into layers comprising a hydrophilic colloid and that would give rise to the formation of repellency spots in said layers when no compounds according to the invention were present.

Although the coating aids according to the present invention are mainly intended for use in coating compositions comprising gelatin as hydrophilic colloid, they can also be used as coating aid for coating compositions comprising other hydrophilic colloid materials or mixtures of them, e.g., hydrophilic natural colloids, modified hydrophilic natural colloids or synthetic hydrophilic polymers. More particularly these colloids may be selected of such film-forming natural of modified natural hydrophilic colloids as e.g., glue, casein, zein, hydroxyethyl cellulose, carboxymethyl cellulose, methyl cellulose, carboxymethyl hydroxyethyl cellulose, gum arabic, sodium alginate and hydrophilic derivatives of such colloids. They may also be selected of such synthetic hydrophilic polymers as e.g., polyvinyl alcohol, poly-N-vinyl pyrrolidone, polyvinyl amine, polyethylene oxide, polystyrene sulphonic acid, polyacrylic acid, and hydrophilic copolymers and derivatives of such polymers. In this connection reference is made e.g., to United Kingdom Pat. Specification 1,139,891 and to French Pat. Specification 1,507,874 which relate among others to heat- and/or pressure-sensitive materials comprising a recording layer mainly consisting of a dispersion of hydrophobic thermoplastic polymer particles in a hydrophilic colloid binder.

It has been found that coating aids according to the present invention improve the coating characteristics of coating compositions already at a concentration as low as 0.01 percent by weight relative to the weight of dry colloid. Larger concentrations, however, can also be used but generally the concentration is not higher than 5 percent by weight based on the weight of dry colloid.

The coating aids according to the invention are particularly suitable for use in a coating composition comprising gelatin as hydrophilic colloid, either as an aqueous solution of gelatin or as a photographic emulsion which ordinarily is composed of an aqueous solution of gelatin containing as the light-sensitive material therein, a silver halide such as silver bromide, silver chloride, silver iodide, or mixtures thereof or another light-sensitive substance. The emulsion may contain other substances such as sensitizing dyes, hardeners, stabilizers, pH-adjusting compounds, colour couplers, antifogging agents, development accelerators, thickening agents, developing agents, softening agents, or the like. For instance, the coating aids of the invention are useful in gelatin photographic emulsions, not only those, which are non-optically sensitized, but also in orthochromatic and panchromatic emulsions. This also includes gelatin emulsions intended for colour photography such as those containing colour forming couplers and fine-grain emulsions of the Lippmann-type.

The coating aids of use according to the present invention and their mixtures with other coating aids are also very useful in various other types of coating compositions in which gelatin is an important constituent, for example, in gelatin coating compositions to be applied as antihalation layer to the back or front of the base in a photographic material, as protective layer, as filter layer, as intermediate layer, as anticurling layer, etc. which layers can also contain all kinds of other ingredients such as filling agents, hardening agents, antistatic agents, antifriction agents, or in any type of gelatin layer, which is coated from a composition comprising an aqueous solution of gelatin.

The coating compositions in accordance with our invention may be coated on a transparent support. e.g., of glass, cellulose esters, polyethylene terephthalate or on a nontransparent reflecting material such as paper or an opaque cellulose ester. It is often desirable first to coat a subbing layer to the support, this practice of subbing being well known in the art.

The coating procedure may comprise any of the standard procedures employed in industry, such as roller coating, brush coating, dip-coating, spraying, using a doctor blade or an air blade to control the thickness and distribution of the coating composition.

The following example illustrates the present invention.

EXAMPLE

A series of three aqueous gelatin solutions comprising per kg 50 g of gelatin were prepared.

To each of these gelatin compositions a certain amount of coating aid was added as listed in the table below.

After having been coated on a conventional subbed cellulose triacetate support the number of repellency spots in the layer formed was counted.

The results found are listed in the following table.

| Coating aid used per kg gelatin solution | Repellency spots per sq.m. |
| --- | --- |
| 15 ml of a 12 % aqueous solution of saponine | 8 |
| 10 ml of a 5 % aqueous solution of compound 1 | 1 |
| 10 ml of a 5 % aqueous solution of compound 2 | 1 |

We claim:

1. A coating composition comprising a hydrophilic colloid and at least one surface active compound corresponding to the formula:

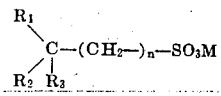

wherein:

M stands for hydrogen, an alkali metal atom, ammonium or organic ammonium, $n$ stands for 0 or 1, $R_3$ stands for hydrogen or when $n = 1$ may be alkyl, and each of $R_1$ and $R_2$ stands for a straight-chain or branched-chain alkyl group or together represent the atoms necessary to close an alicyclic ring structure, and the moiety

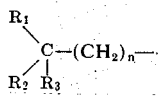

contains from 10 to 20 carbon atoms.

2. A photographic element comprising a support and one or more water-permeable collaid layers including light-sensitive silver halide emulsion layers wherein one or more of said layers comprise a compound corresponding to the formula:

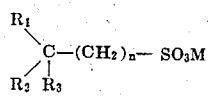

wherein:

M stands for hydrogen, an alkali metal atom, ammonium or organic ammonium, $n$ stands for 0 or 1, $R_3$ stands for hydrogen or when $n = 1$ may be alkyl, and each of $R_1$ and $R_2$ stands for a straight-chain or branched-chain alkyl group or together represent the atoms necessary to close an alicyclic ring structure, and the moiety

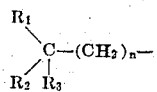

contains from 10 to 20 carbon atoms.

3. A coating composition according to claim 1, wherein the said compound is present in an amount of from 0.01 to 5 percent by weight based on the weight of dry colloid.

4. A coating composition according to claim 1, wherein the hydrophilic colloid is gelatin.

5. A photographic element according to claim 2, wherein the said compound is present in the said layer in an amount of from 0.01 to 5 percent by weight based on the weight of dry colloid in the said layer.

6. A photographic element according to claim 5, wherein the said colloid is gelatin.

7. A photographic element according to claim 2, wherein the said colloid layer comprising the said compound is a light-sensitive silver halide emulsion layer.

8. A photographic element according to claim 2, wherein the said colloid layer comprising the said compound is a protective hydrophilic colloid layer coated over a silver halide emulsion layer.

9. The coating composition of claim 1 wherein the surface active compound is isooctadecyl sulfonate.

10. The coating composition of claim 1 wherein the surface active compound is isohexadecyl sulfonate.

11. The photographic element of claim 2 wherein said compound is osooctadecyl sulfonate.

12. The photographic element of claim 2 wherein said compound is isohexadecyl sulfonate.

* * * * *